C. C. ANDERSON.
AUTOMOBILE HOOD AND RADIATOR COVER.
APPLICATION FILED APR. 9, 1915.
1,218,039. Patented Mar. 6, 1917.
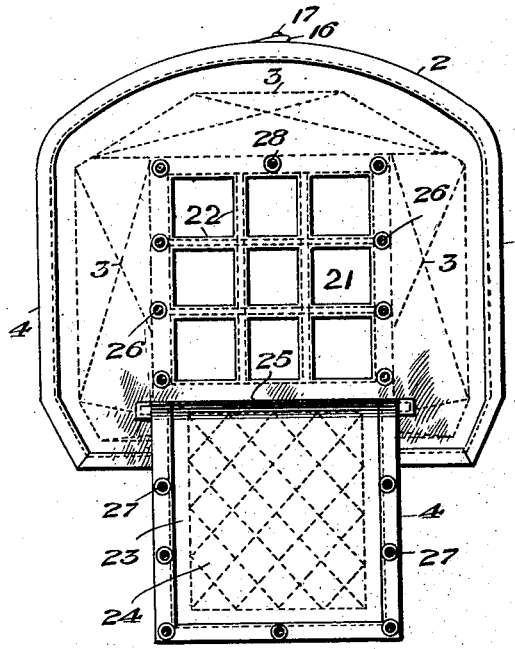
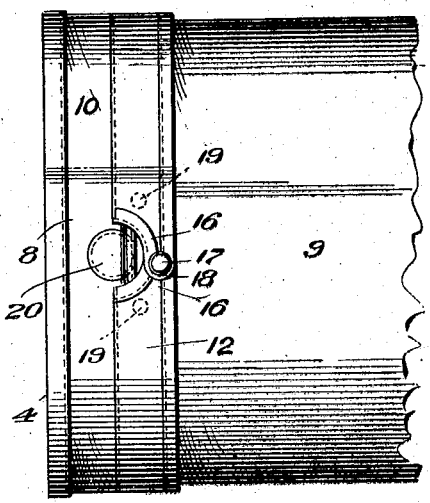
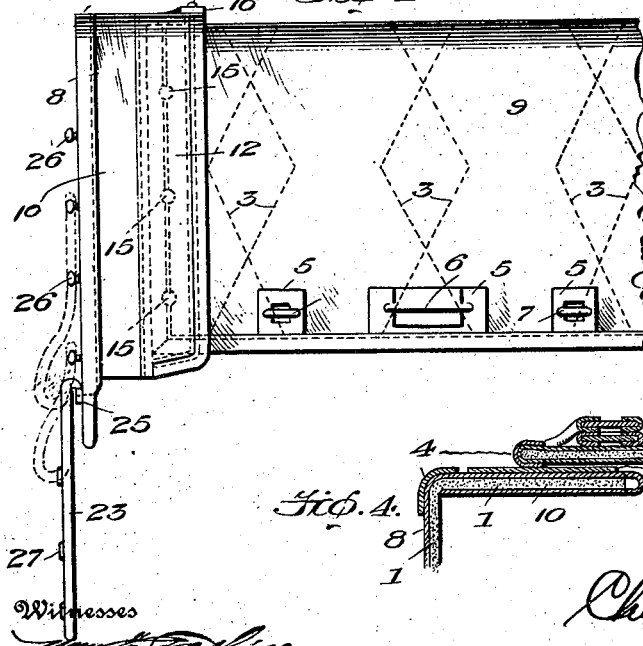
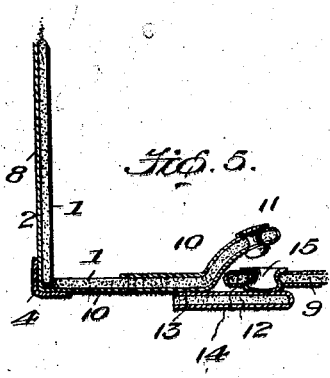
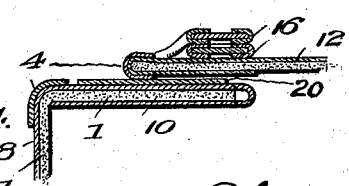
Inventor
Charles C. Anderson

UNITED STATES PATENT OFFICE.

CHARLES C. ANDERSON, OF FARGO, NORTH DAKOTA.

AUTOMOBILE HOOD AND RADIATOR COVER.

1,218,039.  Specification of Letters Patent.  Patented Mar. 6, 1917.

Application filed April 9, 1915. Serial No. 20,214.

*To all whom it may concern:*

Be it known that I, CHARLES C. ANDERSON, a citizen of the United States, residing at Fargo, county of Cass, and State of North Dakota, have invented certain new and useful Improvements in Automobile Hood and Radiator Covers, of which the following is a specification.

This invention relates to automobile hood and radiator covers.

My object is to provide a cover of improved construction for automobile hoods or bonnets and radiators by which different sized openings may be readily provided, according to the weather, for the access of air to the radiator; further, to make the hood cover and radiator cover in detachable sections having an improved connection adapted to exclude the wind and the cold and by which the fastenings connecting the hood cover and radiator cover are protected from the weather; still further, to provide improved detail constructions to carry out the foregoing objects.

The embodiment of the invention hereinafter set forth and which is disclosed in the accompanying drawings is to be considered as illustrative, rather than restrictive, of the scope of the invention, as my invention is susceptible of modification and I do not, therefore, limit myself to the details of construction set forth except where specified in the claims.

In the accompanying drawings:

Figure 1 is a front view, the front of the lapel being down;

Fig. 2, a side elevation, partly broken away, dotted lines showing how the flap or lapel can be secured in different positions;

Fig. 3, a plan view, partly broken away;

Fig. 4, a detail vertical section showing the tabs and construction in the region of the radiator nozzle; and Fig. 5, a detail section showing the joint or connection between the radiator cover section and the hood cover section.

Preferably, the parts of the cover comprise the inner layer or lining 1 of felt and the outer covering of waterproof fabric 2, the lining 1 and outer layer 2 being quilted by suitable lines of stitching 3. Preferably, the edges will be reinforced with leather 4 and leather patches 5 will be provided where the handles 6 of the hood and the turn-button fastenings 7 are to project through. The radiator cover section 8 and the hood or bonnet cover 9 are made separately and connected by the improved detachable connection shown in detail in Fig. 5. The radiator section 8 has a band 10 adapted to overlie the top and sides of the radiator and provided with snap buttons 11. A continuous flap 12 which is stitched to the band 10 at 13 is adapted to overlie the forward edge 14 of the hood cover 9. The forward edge 14 carries snap sockets 15 arranged to receive the snap fastenings 11. Thus, the edge 14 is arranged between the band 10 and the flap 12, affording, with the snap fastenings, a tight joint between the sections 8 and 9 which is well adapted to exclude cold, rain, snow, sleet and air while also permitting rapid and easy detachment of the sections 8 and 9.

At the top, the flap 12 is provided with tabs 16 adapted to embrace the nozzle of the radiator connected by a snap fastening composed of the button 17 and socket 18. The cover section 9 and radiator section 8 are connected by snap fastenings 19 in the region where the nozzle goes through, to cause the parts to tightly hug the nozzle. The section 8 is provided with a protective leather patch 20 where the nozzle passes through; the cover and patch are cut out according to the size of the nozzle.

In the front of the cover section 8 is provided an opening 21 to expose the front of the radiator. The margins of this opening are connected by vertical and transverse waterproof fabric strips or tabs 22 which cause the front portion of the section 8 to lie flat and snug against the front of the radiator and distortion of the opening 21 is thus prevented. The flap or radiator lapel 23 is quilted and felted as previously explained and, in addition, the inner face thereof is covered with leather 24. This flap is connected to the section 8 along the bottom edge 25 of the flap, thus hinging the flap so that it is adapted to drop down. The radiator cover has equidistantly spaced snap buttons 26 on its side portions for the engagement of snap sockets or fastenings 27 equi-distantly spaced to the sockets and located on the flap 23. In addition, one or more snap fastenings 28 are adapted to connect the upper edge of the flap to the upper portion of the front of the section 8. The equi-distant spacing of the snap fastenings on the cover 8 and the flap 23 enables any desired portion of the opening 21 to be covered, as illustrated in Fig. 2 by full and dotted lines, and in addition, the flap may be secured when wholly covering the opening 21, or when wholly uncovering said opening, as shown in Fig. 2. When the opening 21 is wholly uncovered, the fastenings permit the flap 23 to be doubled upon itself and to be retained, instead of depending freely and flapping about.

Having thus described my invention, what I claim as new and desire to secure by Letters Patent, is:—

1. A cover for automobile radiators having an opening to expose the radiator, a flexible flap or lapel having a permanent, direct hinging connection with the cover section, and a plurality of fastenings disposed at different points on the flap or lapel and on the radiator cover section, whereby greater or lesser portions of the flap or lapel may be fastened to the cover section and utilized to cover greater or lesser portions of the aforesaid opening, said flap being free for flexing from its point of hinging to its free edge.

2. A cover for automobile radiators having an opening to expose the radiator, and a flexible flap or lapel having a permanent, direct hinging connection with the cover section, and equidistantly spaced fastenings on the cover section and on the flap, those on the flap being spaced apart the same distance as those on the cover section, whereby greater or lesser portions of the flap or lapel may be fastened to the cover section and utilized to cover greater or lesser portions of the aforesaid opening, said flap being free for flexing from its point of hinging to its free edge.

CHARLES C. ANDERSON.